United States Patent Office 3,637,889
Patented Jan. 25, 1972

3,637,889
PROCESS FOR SEPARATING A TERTIARY OLEFIN
Yoshihiro Watanabe, Hyogo, and Jiro Kobayashi and Tooru Tokumaru, Osaka, Japan, assignors to Sumitomo Chemical Co., Ltd., Osaka, Japan
No Drawing. Filed Mar. 9, 1970, Ser. No. 17,984
Claims priority, application Japan, Mar. 12, 1969, 44/19,114
Int. Cl. C07c 1/20, 7/00, 11/08
U.S. Cl. 260—682          11 Claims

ABSTRACT OF THE DISCLOSURE

A process for separating a tertiary olefin present in $C_4$–$C_5$ cracked petroleum fractions by (1) reacting the $C_4$–$C_5$ fraction with a $C_1$ to $C_4$ primary aliphatic alcohol at 70 to 150° C. in the presence of a small amount of sulfuric acid catalyst to selectively convert a tertiary olefin, such as isobutylene, to a tertiary butyl alkyl ether, (2) separating the ether from the unreacted olefins and passing it over a metal sulfate catalyst maintained at 150 to 250° C. to recover the isobutylene and the alcohol. The alcohol may then be recycled to the first reaction.

Both reactions can be performed with high reactivity and selectivity.

BACKGROUND OF THE INVENTION

(1) Field of the invention

The present invention relates to a process for separating a tertiary olefin from liquid or gaseous saturated and unsaturated hydrocarbon mixtures.

(2) Description of the prior art

Heretofore, various conventional sulfuric acid-extraction processes have been employed industrially for separating tertiary olefins from mixtures containing them. In all of these sulfuric acid-extraction processes, hot, concentrated sulfuric acid must be used and, therefore, it has been necessary to employ expensive apparatus. Further, since side reactions involving the tertiary olefin, such as polymerization, hydration, etc. occur during the extraction, such sulfuric acid-extraction processes are not always satisfactory in yield and quality of products.

As shown in U.S. Pat. No. 3,135,807 a tertiary ether can be obtained by contacting a vapour mixture of hydrocarbons containing a tertiary olefin and a primary alcohol in the vapor phase with a solid catalyst comprising phosphorous molybdenates of various metals at an elevated temperature and pressure.

To decompose a tertiary ether to obtain a tertiary olefin, methods using various solid catalysts such as alumina, low surface area magnesia, etc., have already been described in U.S. Pat. No. 3,170,000. However, since these catalysts are low in activity as the comparison examples described below show, the reaction rate is low and therefore the reaction must be performed at an elevrated temperature. As a result of the higher temperature required, unfavorable side reactions, such as dehydration and etherification of the alcohol, accompany the main reaction.

SUMMARY OF THE INVENTION

The present invention comprises reacting a $C_4$ or $C_5$ tertiary olefin, when present in hydrocarbon mixtures consisting of compounds of approximately the same boiling range, with a $C_1$ to $C_4$ primary alcohol to convert the tertiary olefin to a tertiary ether, separating the tertiary ether from the unreacted hydrocarbon mixture and decomposing the tertiary ether to said tertiary olefin and primary alcohol by contact with any suitable catalyst in the vapor phase.

In particular, the present invention relates to process for decomposing a tertiary ether to a tertiary olefin and a primary alcohol in good yield, which is the second reaction in the above process.

The present invention can be utilized for separating a wide variety of substantially pure tertiary olefins, for example, isobutylene present in a mixture of $C_4$ fraction obtained in the thermal decomposition of naphtha, or isoamylene present in a $C_5$ fraction obtained by such decomposition.

DETAILED DESCRIPTION OF THE INVENTION

According to the process of the present invention, addition takes place easily between the tertiary olefin and the primary alcohol in the presence of a small amount of acid catalyst to give the tertiary ether.

The resultant tertiary ether differs from the components of the starting hydrocarbon mixtures in boiling point and, therefore, can be easily separated by conventional methods such as distillation, etc. Olefins other than tertiary olefins can be handled in substantially the same manner as the inert saturated hydrocarbons, since they are remarkably low in reaction rate with primary alcohol.

The separated tertiary ether can be completely decomposed to tertiary olefin and primary alcohol by contact with a solid catalyst consisting of various metal sulfates in the vapor phase.

Thus, in the separation process of the present invention it is not necessary to use expensive apparatus, since both reactions can be performed under mild conditions. Further since side reactions occur only slightly in both reactions, the separation process has the advantage that yield is high and the quality of the product is excellent.

The etherification step of the present invention can be performed by any known method. For example, when hydrocarbon mixtures containing a tertiary olefin and a primary alcohol are heated at a temperature of about 70 to 150° C. under pressure sufficient to maintain liquid phase in the presence of a small amount of acid catalyst, the tertiary olefin is converted to a tertiary ether in good yield. An acid catalyst can be used in the etherification, such as a mineral acid, for example sulfuric acid, phosphoric acid, hydrochloric acid, etc., an organic sulfonic acid, such as benzene sulfonic acid, para-toluenesulfonic acid, etc., Friedel-Craft catalysts such as cuprous chloride, ferrous chloride, etc., an ion-exchange resin in the hydrogen form, or the like.

In view of the reaction rate of the tertiary olefin, use of the liquid phase is preferable. Although, as a primary alcohol suitable for the etherification, any $C_1$ to $C_4$ alcohol can be used, an alcohol which possesses a large difference in boiling point from that of the tertiary olefin to be finally separated, is suitable. For example, methanol and ethanol are suitable for separating isobutylene present in a $C_4$ fraction. In this case, isobutylene is converted either to tertiary butyl methyl ether or tertiary butyl ethyl ether, the boiling points of which are 55° C. and 73° C. respectively, and each of the tertiary ethers formed are separated easily, since the difference in boiling point between the ether and unreacted $C_4$ mixture is great.

The decomposition of the tertiary ether can be performed in good yield by using various metal sulfate catalysts.

After the tertiary ether is separated from the unreacted hydrocarbon mixture, the ether is evaporated and contacted with the above-mentioned solid catalyst in the vapor phase to be decomposed to a tertiary olefin and a primary alcohol. After separation of the alcohol from the tertiary olefin, the alcohol can be recycled to the etherification step.

As can be seen from a comparison of Examples 2 and 3 and Comparison Examples 1 and 2, the disadvantage of the method of the above-mentioned U.S. patent has been solved by using the metal sulfate catalyst of the present invention, with which the tertiary ether can be decomposed to the tertiary olefin and primary alcohol in higher yields and at lower temperatures. As metal sulfate catalysts to be used in the decomposition may be mentioned, for example, calcium sulfate, manganese sulfate, nickel sulfate, copper sulfate, cobalt sulfate, cadmium sulfate, strontium sulfate, ferrous sulfate, aluminum sulfate, ferric sulfate, chromium sulfate and mixtures thereof. They can be used after calcination and shaping, or they can be supported on various carriers. Various materials can be used as carriers, such as alumina, silica, active carbon, zinc oxide, low surface area pumice, etc. obtained by calcination at an elevated temperature. The activity of the catalyst may be elevated by calcination at 200 to 500° C., preferably 250 to 450° C.

It is not necessary that the tertiary ether be completely purified to the decomposition reaction of the present invention, so long as unreacted n-olefins are removed.

The ether decomposition temperature can be varied depending on the particular catalyst and contact time, but is, in general, 100 to 300° C., and preferably 150 to 250° C.

Similarly, the contact time can range from 0.5 to 20 seconds with proper selection of catalyst, reaction conditions, etc., the tertiary ether is completely decomposed and the products obtained almost completely comprise only the tertiary olefin and alcohol.

As described above, if an alcohol is used which is greatly different from the tertiary olefin in boiling point, highly pure tertiary olefin can be separated from the alcohol by simple means, such as distillation, water washing, etc.

Practical and presently preferred embodiments of the present invention are illustratively shown in the following examples, wherein all percentages are by weight unless otherwise noted.

EXAMPLE 1

The etherification was performed using a $C_4$ mixture which is the residue of a mixture of $C_4$ fractions from which butadiene had been extracted.

The composition of $C_4$ mixture after butadiene extraction was as follows.

| Component: | Percent by wt. |
|---|---|
| Iso-butane | 1.8 |
| n-Butane | 9.9 |
| Butene-1 | 26.1 |
| Iso-butylene | 40.5 |
| Trans-butene-2 | 10.5 |
| Cis-butene-2 | 6.9 |
| Butadiene | 4.3 |

56% of the $C_4$ mixture, 31% of methanol and 0.2% of concentrated sulfuric acid as a catalyst were charged into a stainless steel reaction vessel. It was then tightly closed and heated at 110° C. for 1 hour to perform the reaction, while being stirred by means of an electromagnetic-type induction stirrer. After the reaction, the vessel was cooled and the major part of the unreacted olefins were purged. Thereafter, the liquid product was analyzed by gas-chromatography. The product was found to contain 33% tertiary butyl methyl ether and 18% unreacted methanol.

Thus, 92% of the isobutylene in the starting $C_4$ mixture was converted to tertiary butyl methyl ether.

A portion of the product was distilled to separate sulfuric acid and unreacted methanol as residue and ether as distillate. Excess methanol was recovered substantially without side reactions from the residue. The distillate was further purified by washing with water and then distilling to obtain tertiary butyl methyl ether above 99.5% in purity.

EXAMPLE 2

The tertiary butyl methyl ether above 99.5% in purity obtained in Example 1 was decomposed in the presence of a metal sulfate catalyst.

Each 10 cc. of catalyst as shown below, of 12 to 24 mesh in particle size, was charged into a glass reaction tube of 14 mm. I.D. which was regulated to the temperatures shown in Table 1 by heating from outside in a small electrical furnace. The starting raw material, tertiary butyl methyl ether was pumped into an evaporator maintained at 150° C. by means of a continuous micro-injector and was evaporated. The evaporated ether vapour was then introduced into a reaction tube. The gas effluent produced in the reaction tube was introduced into a trap containing an appropriate amount of solvent and maintained at −70° C. to be condensed and liquified. This liquid was analyzed by gas-chromatography to determine the contents of isobutylene, methanol, and unreacted tertiary butyl methyl ether. The four metal sulfate catalysts shown in Table 1 were prepared as shown below. For comparison, the results of decomposition reactions using only comparison catalysts (1) and (2) are also shown in Table 1. The conversion and selectivity values in Table 1 are determined as follows:

TBME* conversion, percent $$= \frac{\text{moles of supplied TBME} - \text{moles of recovered unreacted TBME}}{\text{moles of supplied TBME}} \times 100$$

Selectivity based on isobutylene, percent $$= \frac{\text{moles of produced isobutyene}}{\text{moles of supplied TBME} - \text{moles of recovered, unreacted TBME}} \times 100$$

Selectivity based on methanol, percent $$= \frac{\text{moles of produced methanol}}{\text{moles of supplied TBME} - \text{moles of recovered, unreacted TBME}} \times 100$$

*TBME = tertiary butyl methyl ether.

The catalysts were prepared as follows:

(1) Nickel sulfate (5%)—Silica gel

Nickel sulfate ($NiSO_4 \cdot 7H_2O$), dissolved in a small amount of water, was absorbed into silica gel in an amount of 5% of the silica gel carrier (nikki Chemical N608) on a dry basis, charged into a reaction tube, and then calcined in a stream of nitrogen gas at 300° C. for 3 hours.

(2) Ferrous sulfate (10%)—sintered alumina

Ferrous sulfate was supported on sintered alumina (Norton Co. Allundrum SA 5203) in the same manner as in (1) and, after charging into a reaction tube, calcined in a stream of nitrogen gas at 350° C. for 3 hours.

(3) Aluminum sulfate

Anhydrous aluminum sulfate (chemical grade) was pressed into shape, calcined in an electrical furnace at 400° C. and, after calcination, was crushed to a size ranging from 12 to 24 mesh.

(4) Copper sulfate (5%)—active carbon

Copper sulfate was supported on active carbon (Tsurumi Coal Kogyo Co. Tsurumi Coal 4CA) in the same manner as in (1) and, after being placed into a reaction tube, was calcined in a stream of nitrogen gas at 350° C. for 4 hours.

TABLE 1

| Catalyst | Reaction temp., °C. | Contact time, sec. | TMBE conversion | Percent Selectivity based on butylene | Selectivity based on methanol |
|---|---|---|---|---|---|
| Example 2 | | | | | |
| Nickel sulfate-silica gel | 200 | 3.6 | 100 | 100 | 99 |
| Ferrous sulfate-sintered alumina | 250 | 3.6 | 95 | 99 | 100 |
| Aluminum sulfate | 230 | 4.5 | 90 | 98 | 99 |
| Copper sulfate-active carbon | 200 | 4.5 | 97 | 97 | 98 |
| Comparison Example 1 | | | | | |
| Silica gel | 350 | 3.6 | 76 | 90 | 88 |
| Comparison Example 2 | | | | | |
| Sintered aluminum | 350 | 4.5 | 54 | 93 | 97 |

EXAMPLE 3

Following the method of Example 1, tertiary amyl ethyl ether of above 99% in purity was synthesized by using a commercially available 2-methylbutene-2, having an analysis of 92% of 2-methylbutene-2 and 8% of 2-methylbutene-1, and ethanol, using a small amount of para toluene sulfonic acid as a catalyst. Using the same reaction apparatus as in Example 2, the decomposition of tertiary amyl ethyl ether was performed. The reaction was carried out at a reaction temperature of 220° C., a contact time of 3.6 seconds and using the same nickel sulfate-silica gel as in (1) of Example 2.

The results were as follows:

```
                                                    Percent
Conversion of tertiary amyl ethyl ether _____ 97
Selectivity based on 2-methyl butene-2 and 2-methyl
    butene-1 _____ 96
Selectivity based on ethanol _____ 98
```

What is claimed is:
1. A process of decomposing a tertiary ether to a tertiary olefin and a primary alcohol which comprises contacting said tertiary ether with a metal sulfate catalyst in the vapor phase.
2. The process of claim 1, wherein the decomposition temperature is 100 to 300° C.
3. The process of claim 1, wherein the contact time is from 0.5 to 20 seconds.
4. The process according to claim 1, wherein said metal sulfate catalyst is selected from the group consisting of calcium sulfate, manganese sulfate, nickel sulfate, copper sulfate, cobalt sulfate, cadmium sulfate, strontium sulfate, ferrous sulfate, aluminum sulfate, ferric sulfate, chromium sulfate and mixtures thereof.
5. The process of claim 1, wherein the tertiary olefin is selected from the group consisting of isobutylene and isoamylene.
6. The process of claim 1, wherein the primary alcohol is selected from the group consisting of methanol and ethanol.
7. A process for separating a $C_4$ to $C_5$ tertiary olefin present in a $C_4$ to $C_5$ hydrocarbon mixture which comprises selectively reacting said tertiary olefin with a primary alcohol in the presence of an acid catalyst in the liquid phase to convert it to a tertiary ether, separating the tertiary ether from the unreacted hydrocarbon mixture and contacting said tertiary ether with a metal sulfate catalyst to decompose it to a tertiary olefin and a primary alcohol.
8. The process of claim 7, wherein the etherification temperature is about 70 to 150° C. and the pressure is sufficient to maintain the liquid phase.
9. The process of claim 7, wherein the acid catalyst is selected from the group consisting of a mineral acid, an organic sulfonic acid, a Friedel-Craft catalyst, and an ion-exchange resin in the hydrogen form.
10. The process of claim 7, wherein the $C_1$ to $C_4$ alcohol is selected from the group consisting of methanol and ethanol.
11. The process of claim 7, wherein the $C_4$ to $C_5$ tertiary olefin is selected from the group consisting of isobutylene or isoamylene.

References Cited

UNITED STATES PATENTS

| | | | |
|---|---|---|---|
| 2,972,645 | 2/1961 | Verdol et al. | 260—681 |
| 3,026,362 | 3/1963 | McKeever | 260—677 A |
| 3,121,124 | 2/1964 | Verdol | 260—677 A |

DELBERT E. GANTZ, Primary Examiner

G. E. SCHMITKONS, Assistant Examiner

U.S. Cl. X.R.

260—677 A